[19] United States Patent
Böder

[11] 3,936,535
[45] Feb. 3, 1976

[54] METHOD OF PRODUCING FIBER-REINFORCED COMPOSITE MEMBERS

[75] Inventor: Horst Böder, Westendorf uber Donauworth, Germany

[73] Assignee: Sigri Elektrographit GmbH, Meitingen b. Augsburg, Germany

[22] Filed: Feb. 7, 1973

[21] Appl. No.: 330,186

[30] Foreign Application Priority Data
Feb. 12, 1972 Germany............................ 2206700

[52] U.S. Cl. .................. 427/228; 8/115.6; 264/29; 423/447
[51] Int. Cl.$^2$............................................ B05D 3/02
[58] Field of Search ................ 117/46 CC; 423/447; 264/29; 8/115.6; 427/228

[56] References Cited
UNITED STATES PATENTS

| | | | |
|---|---|---|---|
| 3,367,812 | 2/1968 | Watts............................ | 117/46 CC |
| 3,462,289 | 8/1969 | Rohl............................... | 117/46 CB |
| 3,573,086 | 3/1971 | Lambdin......................... | 117/46 CB |
| 3,657,061 | 4/1972 | Carlson et al. ................. | 117/46 CC |
| 3,772,115 | 11/1973 | Carlson et al. ................. | 117/46 CC |
| 3,814,642 | 6/1974 | Araki et al. .................... | 117/46 CC |

Primary Examiner—William D. Martin
Assistant Examiner—Janyce A. Bell
Attorney, Agent, or Firm—Herbert L. Lerner

[57] ABSTRACT

To produce heat-resistant carbon or graphite-fiber reinforced composite members having improved strength and uniformity, the fibers are coated with a dilute solution or emulsion of a hardenable resin, dried to remove the solvent, and laid out in porous layers. The layers are subsequently impregnated with tar pitch and heated to 900°C so as to carbonize the resin and the tar pitch. The composite members, which consist of a carbon matrix with reinforcing fibers of carbon or graphite, are especially suited for components which are simultaneously stressed thermally and mechanically, such as heat shields, casting molds, crucibles and the like.

6 Claims, No Drawings

METHOD OF PRODUCING FIBER-REINFORCED COMPOSITE MEMBERS

The invention relates to a method of producing heat-resistant, fiber-reinforced composite members.

To produce heat-resistant form bodies or moldings, it has been known heretofore to form mixtures of granular or powdered carbon-containing solids, such as petroleum and pitch coke, graphite and carbon black as well as binding agents such as tar pitch and synthetic resins, for example, in extrusion or die or stamping presses or by other forming processes and, subsequently to heat them to temperatures of about 1000°C or more to carbonize the binding agent. Such carbon bodies have excellent heat resistance in a non-oxidizing atmosphere and outstanding mechanical properties, especially since the tensile strength and the modulus of elasticity increase with temperature.

For some fields of use, however, such as in aeronautical and space technology, for example, the relatively low strength and particularly the fracture characteristic thereof, which resembles that of brittle materials, are a disadvantage. This characteristic is fundamentally unchanged by impregnating carbon bodies with tar pitch, synthetic resins or pyrocarbon, and the strength increased by the impregnations is offset by the greater weight of the moldings, that is disadvantageous for many uses.

The ultimate strength of carbon bodies is mainly determined by the solids used, and it is to be expected that by processing largely faultfree solids, such as fibers or whiskers, for example, which can in addition be embedded with suitable orientation into the moldings, a considerable increase in the strength and uniformity of the bodies can be obtained. Greater improvements in the strength and rigidity of the bodies will naturally be attainable only if the binding agent coke matrix adheres firmly to the embedded fibers, and applied stresses can be transmitted to the fibers.

From U.S. Pat. No. 3,462,289 to C. W. Rohl, et al., it is known to produce fiber-reinforced carbon members by mixing carbon fibers with a binding agent consisting of synthetic resins, molding the mixture and, thereafter, heating it so as to carbonize the binding agent. Since the binding agent shrinks during the carbonizing phase and separates partially or completely from the surface of the fiber, the carbon fibers are bonded only very loosely with the coke matrix. Under mechanical load, the fibers barely absorb the stresses, and the strength of the member is determined almost completely by the strength of the coke matrix. French Pat. No. 1,476,157 therefore provides for impregnating the moldings with pyrocarbon after carbonizing. For this purpose, carbon-containing gases are passed at temperatures between 800° and 900°C over the moldings, at the outer and inner surfaces of which, carbon is deposited through decomposition of the hydrocarbons. The disadvantage of this method is that pyrocarbon is preferentially precipitated in the outer zones of the molding and the deposits thereof impede the gas exchange with the center of the member and finally prevent it altogether. The resulting drop in density and strength from the outside to the inside can be prevented only by costly control of the reaction conditions.

From German Published Non-Prosecuted Patent Application DDS No. 1,571,390, it is known to form carbon or graphite fibers, without a binder, into a member of predetermined shape, then to subject the member to reduced pressure, and, thereafter, to impregnate the member with a binder under pressure. The binder is then cured similarly under pressure, and is carbonized by heating in a protective gas atmosphere. The member is then impregnated, cured and carbonized at least once more. To anchor the fibers in the coke matrix completely, however, about six such cycles are necessary, which creates a considerable technical expenditure.

A further disadvantage of the heretofore known methods of producing fiber reinforced composite members is that the reinforcing fibers are initially covered with a closed resin film, so that shrinkage stresses produced during the carbonizing step are completely transmitted to the fibers, until finally the coke layer that is formed breaks off. Since very high peak stresses are produced, damage to the fibers, for instance through the fracture of individual filaments, is unavoidable.

It is accordingly an object of the invention to avoid the foregoing difficulties and disadvantages of the heretofore known methods and to provide a method of producing heat-resistant composite members that have great strength and uniformity.

With the foregoing and other objects in view, there is provided in accordance with the invention, a method of producing heat-resistant, fiber-reinforced composite members, which comprise coating ceramic fibers, such as carbon or graphite fibers with a dilute solution or emulsion of a hardenable resin, drying the coated fibers so as to remove the solvent or the closed phase, respectively by heating, laying out the fibers out in layers, heating the layers to 120° to 180°C so as to cure the resin impregnating the fiber layers with a tar pitch, and heating the tar pitch-impregnated fiber layers to about 900°C to carbonize the resin and the tar pitch. By a "closed phase" is meant the coherent phase of an emulsion, such as water, for example, wherein a second phase, such as resin, for example, is dispersed.

The invention is based upon the perception that layers of diluted resin or resin emulsions applied by spraying, brushing or immersing on ceramic fibers or whiskers exhibit excellent adhesion and do not separate from the fiber surface during curing and carbonizing. Since the thickness of the resin films, which is about 1 to $2\mu m$, is very slight and adjacent fibers are furthermore interlinked only at a limited number of points, only low stresses that are harmless to the fibers are produced during carbonizing and fissures and similar faults are avoided. The fibers which are partially covered with resin coke are embedded in a matrix consisting of coked tar pitch, the brittleness of which is less than that of resin coke, so that the probability of the formation of cracks in the matrix is primarily reduced. The tar pitch coke, in turn, forms a strong bond with the resin coke.

To produce composite members in accordance with the method of the invention, fibers or whiskers that are thermally stable at the carbonizing and application temperature and do not react or react only to a limited extent with the binder phase, are best suited. Graphite fibers and carbon fibers which are used in the form of staple fibers, strings, ribbons, endless filaments or as a mixture of endless filaments and staple fibers, as well as carbon and graphite whiskers, are preferred.

To coat the ceramic fibers, any resin which can be diluted and carbonized is suitable, such as, for example, phenol formaldehyde resin, melamine resin, epoxy resin and furane resin, to which hardening catalysts can be added optionally in a conventional manner. According to the invention, the resins are used in the form of dilute solutions, ethanol solutions containing 1 to 20% by weight of resin being particularly advantageous. According to a further mode of the method of the invention, aqueous resin emulsions the resin content of which is advantageously 1 to 20% by weight, are applied to the fibers.

To coat the filaments with synthetic resin, for example, endless filaments are drawn through a bath filled with a synthetic resin solution, or staple fibers are sprayed with a synthetic-resin solution. After excess solution has drained off, the fibers are laid out in a mold in layers and optionally compressed so that the fiber content is 30 to 70% by volume.

To cure the resin, the members are then heated to about 120° to 180°C, in accordance with the invention. Application of the pressure greater than atmospheric is generally unnecessary, but the curing can be performed in a conventional manner in autoclaves at pressures of 2 to 10 kp/cm$^2$ (kiloponds per square centimeter).

After the curing treatment, the fiber is surrounded by a firmly adhering resin layer. The bond between the individual fibers is loose, however, and numerous substantially cylindrical pores extend parallel to the fibers. These pores are filled with tar pitch in a subsequent impregnating treatment. Suitable impregnating agents are, for example, coal tar pitch with a softening point according to Kraemer-Sarnow of between 300° and 80°C or mixtures of very high-viscosity coal tar pitches with thinning agents, such as anthracene oil, for example. The impregnated members are then heated in an inert atmosphere, such as nitrogen, the rare gases, or carbon monoxide, for example, optionally under pressure, to a temperature above 800°C so as to carbonize the resin and the tar pitch.

The composite members produced in accordance with the method of the invention have a three-phase structure. Predominantly parallel-disposed reinforcing fibers are surrounded by a thin layer consisting of relatively brittle resin coke, and are embedded in a soft matrix of tar pitch coke. Through this construction, good bonding of the fibers that are not damaged by shrinkage stresses and, consequently, the extensive transmission of external stresses through the matrix to the reinforcing fibers are achieved. The composite members produced in accordance with the method of the invention exhibit great uniformity for relatively low densities and great strength. The composite members are highly resistant to thermal shock treatment and, due to their rigidity, are particularly well suited for thermally and mechanically stressed components such as heat shields and rocket nose cones, for example. They can also be used to advantage for casting molds and crucibles, for pipes and channels for transporting melts or reactive liquids, and for chemical apparatus.

Hereinafter, the invention will be described in the form of examples.

EXAMPLE 1

Carbon yarn or thread which had the following properties:

| | | |
|---|---|---|
| Rupture strength | — | 16.4 × 10$^3$ kp/cm$^2$ |
| Modulus of elasticity | — | 1.6 × 10$^6$ kp/cm$^2$ |
| Density | — | 1.72 g/cm$^3$ | was pulled continuously through a trough containing a 10% solution of phenol formaldehyde resin in ethaneol, and the solvent was largely removed by storing the yarn at temperatures between 20° and 30°C. The carbon yarn was then cut into sections of equal length, which were placed in parallel orientation in a mold and compressed into a member having a fiber content of 60% by volume. The molding pressure was about 3 kp/cm$^2$ To cure the phenol formaldehyde resin the composite body was subsequently heated in an oven for 30 minutes at 100°C and for another 30 minutes at 150°C. The member was impregnated with a coal tar pitch, having a softening point of 75°C, and was placed for this purpose in an autoclave, having a pressure which was first reduced to about 0.3 kp/cm$^2$ and, after adding the pitch, was increased to about 2 kp/cm$^2$. The exposure time was about 30 minutes.

The impregnated member was then heated in a nitrogen atmosphere in a muffle furnace with a temperature gradient of about 15°C/hour to 900°C.

The carbonized composite member had the following properties:

| | | |
|---|---|---|
| Bending strength | — | 810 kp/cm$^2$ |
| Modulus of elasticity | — | 0.56 × 10$^6$ kp/cm$^2$ |
| Density | — | 0.82 g/cm$^3$ |

EXAMPLE 2

The carbon twine or yarn aforedescribed in Example 1 was pulled continuously through a 15% phenol formaldehyde resin emulsion in a water-ethanol mixture with a mixing ratio of 2 parts water to 1 part of ethanol and, as further described in Example 1, was cut up after being dried at about 60°C, placed in molds, cured, impregnated and carbonized. The properties of the composite member were as follows::

| | | |
|---|---|---|
| Bending strength | — | 1030 kp/cm$^2$ |
| Modulus of elasticity | — | 0.66 × 10$^6$ kp/cm$^2$ |
| Density | — | 1.07 g/cm$^3$ |

EXAMPLE 3

A graphite yarn or thread with a breaking or rupture strength of 16 × 10$^3$ kp/cm$^2$ and a modulus of elasticity of 2.0 × 10$^6$ kp/cm$^2$ was pulled through a 6% emulsion of phenolic resin in water, dried at about 80°C, then cut into sections of equal length and, thereafter, placed in a mold and compressed. The fiber content was about 65% by volume. The subsequent process steps were the same as those described above in Example 1. The finished composite member had the following properties:

| | | |
|---|---|---|
| Bending strength | — | 1070 kp/cm$^2$ |
| Modulus of elasticity | — | 0.67 × 10$^6$ kp/cm$^2$ |
| Density | — | 1.12 g/cm$^3$ |

EXAMPLE 4

Carbon staple fibers with a length of 2 cm were sprayed with a solution of 20% furfuryl alcohol in ethanol, the solvent was removed by storing at about 50°C, and the sprayed staple fibers were then placed in a mold. The staple fibers which were disposed approximately paralled with the aid of a stream of air were then compressed into a member with a fiber content of about 40% by volume and subsequently processed further as aforedescribed in Example 1.

The properties of the composite member were as follows:

| | | |
|---|---|---|
| Bending strength | — | 630 kp/cm$^2$ |
| Modulus of elasticity | — | 0.52 × 10$^6$ kp/cm$^2$ |
| Density | — | 0.65 g/cm$^3$ |

I claim:

1. Method of producing heat-resistant, fiber-reinforced composite members which comprises coating fibers formed of a substance selected from the group consisting of carbon and graphite first with a substance selected from the group consisting of a dilute solution of hardenable resin and an emulsion of hardenable resin dispersed in a liquid, drying the coated fibers so as to remove, respectively, the solvent or the liquid therefrom, laying out the fibers in layers, curing the layers at 120° to 180°C whereby said fibers are surrounded by a firmly adhering layer of said resin, then impregnating the fiber layers with tar pitch and heating the tar pitch-impregnated fiber layers to a temperature above 800°C to carbonize the tar pitch and the resin.

2. Method according to claim 1 wherein the solution is an ethanol solution of 1 to 20% by weight of resin.

3. Method according to claim 1 wherein the coating resin is phenol formaldehyde or furane resin.

4. Method according to claim 1 wherein the emulsion is an aqueous resin emulsion.

5. Method according to claim 1 wherein the impregnating tar pitch is a coal-tar pitch.

6. Method according to claim 1 wherein the fiber content of the composite members is from 30 to 70% by volume.

* * * * *